US012010588B2

United States Patent
He et al.

(10) Patent No.: US 12,010,588 B2
(45) Date of Patent: Jun. 11, 2024

(54) INDOOR POSITIONING METHODS, APPARATUSES, ELECTRONIC DEVICE AND COMPUTER READABLE STORAGE MEDIUM

(71) Applicant: Rajax Network Technology (Shanghai) Co., Ltd., Shanghai (CN)

(72) Inventors: Tian He, Shanghai (CN); Yi Ding, Shanghai (CN); Yun Ji, Shanghai (CN); Tianye Zhang, Shanghai (CN); Jiaming Lu, Shanghai (CN); Zhigang Dai, Shanghai (CN)

(73) Assignee: RAJAX NETWORK TECHNOLOGY (SHANGHAI) CO., LTD., Shanghai (CN)

( * ) Notice: Subject to any disclaimer, the term of this patent is extended or adjusted under 35 U.S.C. 154(b) by 341 days.

(21) Appl. No.: 17/626,800

(22) PCT Filed: Mar. 14, 2020

(86) PCT No.: PCT/CN2020/079410
§ 371 (c)(1),
(2) Date: Jan. 12, 2022

(87) PCT Pub. No.: WO2021/008148
PCT Pub. Date: Jan. 21, 2021

(65) Prior Publication Data
US 2022/0322043 A1    Oct. 6, 2022

(30) Foreign Application Priority Data
Jul. 16, 2019   (CN) .......................... 201910642269.2

(51) Int. Cl.
*H04W 4/02*         (2018.01)
*H04W 4/029*        (2018.01)
(Continued)

(52) U.S. Cl.
CPC ........... *H04W 4/029* (2018.02); *H04W 4/023* (2013.01); *H04W 4/33* (2018.02); *H04W 64/006* (2013.01)

(58) Field of Classification Search
CPC ....... H04W 4/029; H04W 4/33; H04W 4/023; H04W 64/006
See application file for complete search history.

(56) References Cited

U.S. PATENT DOCUMENTS 9,204,251 B1    12/2015  Mendelson
2011/0086646 A1*   4/2011  Gupta ................... H04W 64/00
                                                455/456.1
(Continued)

FOREIGN PATENT DOCUMENTS

| CN | 101730226 A | 6/2010 |
| CN | 102595592 A | 7/2012 |

(Continued)

OTHER PUBLICATIONS

ISA State Intellectual Property Office of the People's Republic of China, International Search Report Issued in Application No. PCT/CN2020/079410, dated Apr. 24, 2020, WIPO, 5 pages.
(Continued)

*Primary Examiner* — Moustapha Diaby
(74) *Attorney, Agent, or Firm* — Getech Law LLC; Jun Ye

(57) ABSTRACT

Disclosed are indoor positioning methods, apparatuses, electronic device and computer readable storage medium. The indoor positioning method includes: obtaining state data of a mobile terminal; based on a pre-trained position classification model, determining a position classification of the mobile terminal according to the state data of the mobile terminal; when the position classification of the mobile terminal is an anchor point position, taking the mobile terminal as a beacon terminal and sending an anchor point
(Continued)

position broadcast instruction to the beacon terminal to enable the beacon terminal to broadcast the anchor point position. In the technical solution, a mobile terminal meeting anchor point requirements is taken as a beacon terminal to provide convenient positioning services, so as to avoid deployment and maintenance of a large number of beacons, hardware of routers, and related mapping relationship, thus greatly reducing investment costs and facilitating promotion of use.

16 Claims, 4 Drawing Sheets

(51) Int. Cl.
*H04W 4/33* (2018.01)
*H04W 64/00* (2009.01)

(56) References Cited

U.S. PATENT DOCUMENTS

| | | | | |
|---|---|---|---|---|
| 2015/0039226 | A1* | 2/2015 | Ghose | H04W 64/00 701/525 |
| 2020/0175639 | A1* | 6/2020 | Sabripour | H04W 4/90 |

FOREIGN PATENT DOCUMENTS

| | | |
|---|---|---|
| CN | 102710861 A | 10/2012 |
| CN | 104236550 A | 12/2014 |
| CN | 104427615 A | 3/2015 |
| CN | 104504566 A | 4/2015 |
| CN | 104794637 A | 7/2015 |
| CN | 105550909 A | 5/2016 |
| CN | 105606092 A | 5/2016 |
| CN | 106060775 A | 10/2016 |
| CN | 106840140 A | 6/2017 |
| CN | 107315187 A | 11/2017 |
| CN | 108668224 A | 10/2018 |
| CN | 108882362 A | 11/2018 |
| CN | 110324781 A | 10/2019 |
| WO | 2018064581 A1 | 4/2018 |

OTHER PUBLICATIONS

State Intellectual Property Office of the People's Republic of China, Office Action and Search Report Issued in Application No. 2019106422692, dated Feb. 25, 2020, 9 pages. (Submitted with Machine/Partial Translation).

ISA State Intellectual Property Office of the People's Republic of China, Written Opinion of the International Searching Authority Issued in Application No. PCT/CN2020/079410, dated Apr. 24, 2020, WIPO, 6 pages. (Submitted with Machine/Partial Translation).

Developer, A. (2014). Getting Started with iBeacon. Retrieved May 10, 2018.

Dickinson, P., et al., "Indoor Positioning of Shoppers Using a Network of Bluetooth Low Energy Beacons", In 2016 International Conference on Indoor Positioning and Indoor Navigation (IPIN), Oct. 2016, (pp. 1-8).

Yuan, Q., et al., "Who, Where, When and What: Discover Spatio-Temporal Topics for Twitter Users", In Proceedings of the 19th ACM SIGKDD International Conference on Knowledge Discovery and Data Mining, Aug. 2013, (pp. 605-613).

Zhou, P., et al., "Iodetector. A Generic Service for Indoor Outdoor Detection", In Proceedings of the 10th ACM conference on Embedded Network Sensor Systems, Nov. 2012, (pp. 113-126).

* cited by examiner

INDOOR POSITIONING METHODS, APPARATUSES, ELECTRONIC DEVICE AND COMPUTER READABLE STORAGE MEDIUM

CROSS REFERENCE TO RELATED APPLICATIONS

This application is a U.S. National Phase application of PCT/CN2020/079410, filed on Mar. 14, 2020, which claims priority to Chinese Patent Application No. 201910642269.2 filed on Jul. 16, 2019. The entire content of the above-referenced applications is incorporated herein by reference.

TECHNICAL FIELD

The present disclosure relates to the field of indoor positioning technologies, and in particular to indoor positioning methods, indoor positioning apparatuses, an electronic device and a computer readable storage medium.

BACKGROUND

Along with development of scientific technologies, in order to improve service quality, more and more merchants or service providers provide position-based services to users. To provide the position-based services, positions of the users are to be determined firstly. Outdoors, the positions of the users may be determined by capturing GPS positioning signals using mobile phones of the users. However, indoors, the GPS signals cannot be captured or the GPS positioning precision is relatively low. Thus, it is required to achieve the indoor positioning of the users by use of other technologies. Nowadays, a common indoor positioning technology is to deploy Bluetooth-based beacons or Wi-Fi routers as anchor points and estimate a position of a user based on beacon or Wi-Fi position received by the mobile phone of the user. But, this technology requires deployment and maintenance of a large number of beacons, hardware of routers, and related mapping relationship, leading to high investment costs and affecting promotion of use.

SUMMARY

One or more embodiments of the present disclosure provide indoor positioning methods, an indoor positioning apparatuses, an electronic device and a computer readable storage medium.

According to a first aspect of embodiments of the present disclosure, there is provided an indoor positioning method. Specifically, the indoor positioning method includes:
 obtaining state data of a mobile terminal;
 based on a pre-trained position classification model, determining a position classification of the mobile terminal according to the state data of the mobile terminal;
 when the position classification of the mobile terminal is an anchor point position, taking the mobile terminal as a beacon terminal and sending an anchor point position broadcast instruction to the beacon terminal to enable the beacon terminal to broadcast the anchor point position.

In combination with the first aspect, in a first implementation of the first aspect of the present disclosure, the state data of the mobile terminal includes one or more of a current time, a wireless communication device connection state, mobile terminal motion state, illumination data and magnetic field strength data.

In combination with the first aspect and the first implementation of the first aspect, in a second implementation of the first aspect of embodiments of the present disclosure, the obtaining the state data of the mobile terminal specifically comprises: obtaining the state data of the mobile terminal regularly based on a preset time interval.

In combination with the first aspect, the first implementation of the first aspect and the second implementation of the first aspect, in a third implementation of the first aspect of embodiments of the present disclosure, the training of the position classification model includes:
 obtaining training data, where the training data includes mobile device state data, and mobile device position classification data corresponding to the mobile device state data;
 obtaining the position classification model by performing model training with the mobile device state data as input and the mobile device position classification data corresponding to the mobile device state data as output.

In combination with the first aspect, the first implementation of the first aspect, the second implementation of the first aspect and the third implementation of the first aspect, in a fourth implementation of the first aspect of embodiments of the present disclosure, obtaining the training data includes: obtaining the mobile device position classification data according to mobile device position-related data, where the mobile device position-related data includes one or more of mobile device positioning data, mobile device payment data, mobile device transaction data, mobile device sign-in data and mobile device marking data.

In combination with the first aspect, the first implementation of the first aspect, the second implementation of the first aspect, the third implementation of the first aspect and the fourth implementation of the first aspect, in a fifth implementation of the first aspect of embodiments of the present disclosure, obtaining the mobile device position classification data according to the mobile device position-related data includes:
 determining one or more mobile device historical presence positions according to the mobile device position-related data and taking the mobile device historical presence positions as candidate anchor point positions;
 obtaining a target anchor point position by performing clustering for mobile device positioning data corresponding to the candidate anchor point positions, and taking the target anchor point position as the mobile device position classification data.

In combination with the first aspect, the first implementation of the first aspect, the second implementation of the first aspect, the third implementation of the first aspect, the fourth implementation of the first aspect and the fifth implementation of the first aspect, in a sixth implementation of the first aspect of embodiments of the present disclosure, the anchor point position broadcast instruction at least includes identifier information of the anchor point position, such that anchor point position information broadcast by the beacon terminal at least includes the identifier information of the anchor point position.

In combination with the first aspect, the first implementation of the first aspect, the second implementation of the first aspect, the third implementation of the first aspect, the fourth implementation of the first aspect and the fifth implementation of the first aspect and the sixth implementation of the first aspect, in a seventh implementation of the first aspect of embodiments of the present disclosure, the indoor positioning method further includes:

performing encrypted storage for a mapping relationship between identifier information of the beacon terminal, anchor point position of the beacon terminal, and identifier information of the anchor point position of the beacon terminal.

According to a second aspect of embodiments of the present disclosure, there is provided an indoor positioning method.

Specifically, the indoor positioning method includes:
determining state data of a mobile terminal;
sending a beacon positioning request, where the beacon positioning request carries the state data of the mobile terminal;
in response to receiving an anchor point position broadcast instruction, broadcasting an anchor point position according to the anchor point position broadcast instruction.

In combination with the second aspect, in a first implementation of the second aspect of the present disclosure, the state data of the mobile terminal includes one or more of a current time, a wireless communication device connection state, mobile terminal motion state, illumination data and magnetic field strength data.

In combination with the second aspect and the first implementation of the second aspect, in a third implementation of the second aspect of embodiments of the present disclosure, the sending the beacon positioning request includes: sending the beacon positioning request regularly based on a preset time interval.

In combination with the second aspect, the first implementation of the second aspect and the second implementation of the second aspect, in a third implementation of the second aspect of embodiments of the present disclosure, the anchor point position broadcast instruction at least includes identifier information of the anchor point position, such that anchor point position broadcast at least includes the identifier information of the anchor point position.

According to a third aspect of embodiments of the present disclosure, there is provided an indoor positioning method.

Specifically, the indoor positioning method includes:
in response to receiving an anchor point position broadcast from a beacon terminal, obtaining identifier information of an anchor point position in the anchor point position broadcast;
generating and sending an anchor point position obtaining request, where the anchor point position obtaining request carries the identifier information of the anchor point position;
in response to receiving feedback information of the anchor point position obtaining request, obtaining an anchor point position of the beacon terminal and performing positioning based on the anchor point position.

In combination with the third aspect, in a first implementation of the third aspect of the present disclosure, the performing positioning based on the anchor point position includes:
determining signal transmission direction and strength of the beacon terminal;
determining a positional relationship with the beacon terminal according to the signal transmission direction and strength;
determining a position of the mobile terminal according to the positional relationship with the beacon terminal and the anchor point position of the beacon terminal.

According to a fourth aspect of embodiments of the present disclosure, there is provided an indoor positioning apparatus.

Specifically, the indoor positioning apparatus includes:
a first obtaining module, configured to obtain state data of a mobile terminal;
a first determining module, configured to determine a position classification of the mobile terminal according to the state data of the mobile terminal based on a pre-trained position classification model;
a first sending module, configured to, when the position classification of the mobile terminal is an anchor point position, take the mobile terminal as a beacon terminal and send an anchor point position broadcast instruction to the beacon terminal to enable the beacon terminal to broadcast an anchor point position.

In combination with the fourth aspect, in a first implementation of the fourth aspect of the present disclosure, the state data of the mobile terminal includes one or more of a current time, a wireless communication device connection state, mobile terminal motion state, illumination data and magnetic field strength data.

In combination with the fourth aspect and the first implementation of the fourth aspect, in a second implementation of the fourth aspect of embodiments of the present disclosure, the first obtaining module is configured to: obtain the state data of the mobile terminal regularly based on a preset time interval.

In combination with the fourth aspect, the first implementation of the fourth aspect and the second implementation of the fourth aspect, in a third implementation of the fourth aspect of embodiments of the present disclosure, the training of the position classification model is implemented as:
obtaining training data, where the training data includes mobile device state data and mobile device position classification data corresponding to the mobile device state data;
obtaining the position classification model by performing model training with the mobile device state data as input and the mobile device position classification data corresponding to the mobile device state data as output.

In combination with the fourth aspect, the first implementation of the fourth aspect, the second implementation of the fourth aspect and the third implementation of the fourth aspect, in a fourth implementation of the fourth aspect of embodiments of the present disclosure, obtaining the training data is implemented as: obtaining the mobile device position classification data according to mobile device position-related data, where the mobile device position-related data includes one or more of mobile device positioning data, mobile device payment data, mobile device transaction data, mobile device sign-in data and mobile device marking data.

In combination with the fourth aspect, the first implementation of the fourth aspect, the second implementation of the fourth aspect, the third implementation of the fourth aspect and the fourth implementation of the fourth aspect, in a fifth implementation of the fourth aspect of embodiments of the present disclosure, obtaining the mobile device position classification data according to the mobile device position-related data is implemented as:
determining one or more mobile device historical presence positions according to the mobile device position-related data and taking the mobile device historical presence positions as candidate anchor point positions;
obtaining a target anchor point position by performing clustering for mobile device positioning data corresponding to the candidate anchor point positions, and taking the target anchor point position as the mobile device position classification data.

In combination with the fourth aspect, the first implementation of the fourth aspect, the second implementation of the fourth aspect, the third implementation of the fourth aspect, the fourth implementation of the fourth aspect and the fifth implementation of the fourth aspect, in a sixth implementation of the fourth aspect of embodiments of the present disclosure, the anchor point position broadcast instruction at least includes identifier information of the anchor point position, such that anchor point position information broadcast by the beacon terminal at least includes the identifier information of the anchor point position.

In combination with the fourth aspect, the first implementation of the fourth aspect, the second implementation of the fourth aspect, the third implementation of the fourth aspect, the fourth implementation of the fourth aspect, the fifth implementation of the fourth aspect and the sixth implementation of the fourth aspect, in a seventh implementation of the fourth aspect of embodiments of the present disclosure, the indoor positioning apparatus further includes:

a storing module, configured to perform encrypted storage for a mapping relationship between identifier information of the beacon terminal, anchor point position of the beacon terminal, and identifier information of the anchor point position of the beacon terminal.

According to a fifth aspect of embodiments of the present disclosure, there is provided an indoor positioning apparatus.

Specifically, the indoor positioning apparatus includes:
a second determining module, configured to determine state data of a mobile terminal;
a second sending module, configured to send a beacon positioning request, where the beacon positioning request carries the state data of the mobile terminal;
a broadcasting module, configured to, in response to receiving an anchor point position broadcast instruction, broadcast an anchor point position based on the anchor point position broadcast instruction.

In combination with the fifth aspect, in a first implementation of the fifth aspect of the present disclosure, the state data of the mobile terminal includes one or more of a current time, a wireless communication device connection state, mobile terminal motion state, illumination data and magnetic field strength data.

In combination with the fifth aspect and the first implementation of the fifth aspect, in a second implementation of the fifth aspect of embodiments of the present disclosure, the second sending module is configured to send the beacon positioning request regularly based on a preset time interval.

In combination with the fifth aspect, the first implementation of the fifth aspect and the second implementation of the fifth aspect, in a third implementation of the fifth aspect of embodiments of the present disclosure, the anchor point position broadcast instruction at least includes identifier information of the anchor point position, such that the anchor point position broadcast at least includes the identifier information of the anchor point position.

According to a sixth aspect of embodiments of the present disclosure, there is provided an indoor positioning apparatus.

Specifically, the indoor positioning apparatus includes:
a second obtaining module, configured to, in response to receiving an anchor point position broadcast from a beacon terminal, obtain identifier information of an anchor point position in the anchor point position broadcast;
a third sending module, configured to generate and send an anchor point position obtaining request, where the anchor point position obtaining request carries the identifier information of the anchor point position;
a positioning module, configured to, in response to receiving feedback information of the anchor point position obtaining request, obtain an anchor point position of the beacon terminal and perform positioning based on the anchor point position.

In combination with the sixth aspect, in a first implementation of the sixth aspect of the present disclosure, a part used to perform positioning based on the anchor point position in the positioning module is configured to:
determine signal transmission direction and strength of the beacon terminal;
determine a positional relationship with the beacon terminal according to the signal transmission direction and strength;
determine a position of the mobile terminal according to the positional relationship with the beacon terminal and the anchor point position of the beacon terminal.

According to a seventh aspect of embodiments of the present disclosure, there is provided an electronic device, including a memory and a processor. The memory is configured to store one or more computer instructions, where the one or more computer instructions are executed by the processor to implement the steps of the above indoor positioning method.

According to an eighth aspect of embodiments of the present disclosure, there is provided a computer readable storage medium storing computer instructions used by an indoor positioning apparatus, which includes computer instructions involved in implementing the above indoor positioning method by the indoor positioning apparatus.

The technical solutions of the embodiments of the present disclosure may have the following beneficial effects.

In the above technical solutions, when a mobile terminal can be determined as a positioning anchor point, the mobile terminal is taken as a beacon terminal to enable the beacon terminal to broadcast an anchor point position so as to provide positioning information to other mobile terminals. In the technical solutions, a mobile terminal meeting anchor point requirements is taken as a beacon terminal to provide convenient positioning services, so as to avoid deployment and maintenance of a large number of beacons, hardware of routers, and related mapping relationship, thus greatly reducing investment costs and facilitating promotion of use.

It should be understood that the above general descriptions and the subsequent detailed descriptions are merely illustrative and explanatory rather than limiting of the present disclosure.

BRIEF DESCRIPTION OF THE DRAWINGS

Other features, objects and advantages of the present disclosure will become more apparent through detailed descriptions of the following non-limiting embodiments in combination with accompanying drawings.

DETAILED DESCRIPTION OF THE EMBODIMENTS

The exemplary embodiments of the present disclosure will be described in details with reference to the accompanying drawings to enable those skilled in the art to easily implement them. Furthermore, for clarity of descriptions, those parts irrelevant to the descriptions of the exemplary embodiments are omitted in the accompanying drawings.

In the present disclosure, it should be understood that the terms such as "include" or "have" are intended to indicate presence of feature, digit, step, behavior, component, part or combination thereof disclosed in the specification and do not preclude the possibility of presence or addition of one or more other features, digits, steps, behaviors, components, parts or combination thereof.

Further, it should be noted that in a case of no conflicts, the embodiments of the present disclosure and the features in the embodiments may be combined with each other. The present disclosure will be detailed below in combination with the specific embodiments by referring to the accompanying drawings.

In the technical solutions provided by the embodiments of the present disclosure, when a mobile terminal can be determined as a positioning anchor point, the mobile terminal is taken as a beacon terminal to enable the beacon terminal to broadcast an anchor point position so as to provide positioning information to other mobile terminals. In the technical solution, a mobile terminal meeting anchor point requirements is taken as a beacon terminal to provide convenient positioning services, so as to avoid deployment and maintenance of a large number of beacons, hardware of routers, and related mapping relationship, thus greatly reducing investment costs and facilitating promotion of use.

Figure 1:
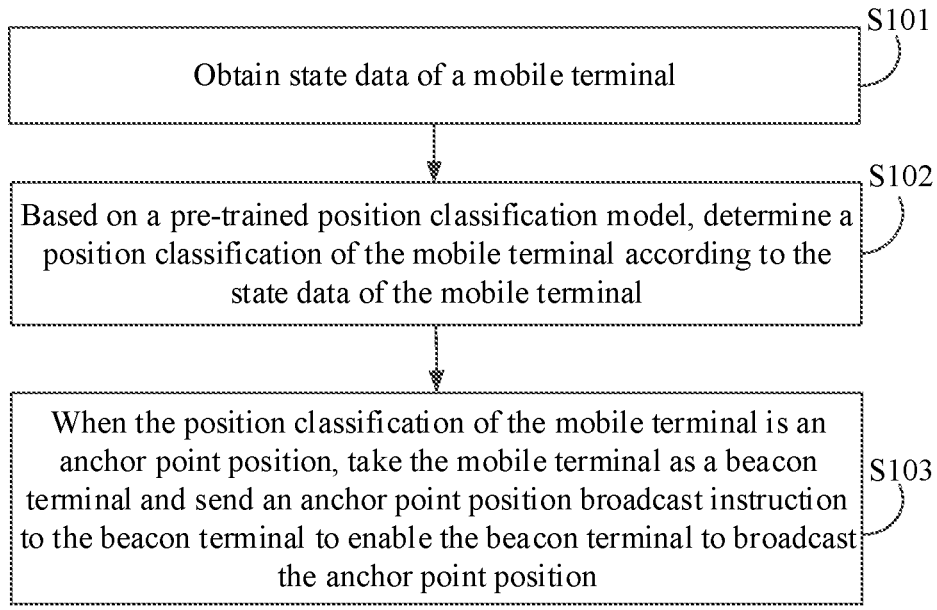
FIG. 1 to FIG. 4 are flowcharts illustrating indoor positioning methods according to different embodiments of the present disclosure.

FIG. 1 is a flowchart illustrating an indoor positioning method according to an embodiment of the present disclosure. The indoor positioning method may be applied to a server end. As shown in FIG. 1, the indoor positioning method includes the following steps S101 to S103.

At step S101, state data of a mobile terminal is obtained.

At step S102, based on a pre-trained position classification model, a position classification of the mobile terminal is determined according to the state data of the mobile terminal.

At step S103, when the position classification of the mobile terminal is an anchor point position, the mobile terminal is taken as a beacon terminal and an anchor point position broadcast instruction is sent to the beacon terminal to enable the beacon terminal to broadcast the anchor point position.

As mentioned above, along with development of scientific technologies, in order to improve service quality, more and more merchants or service providers provide position-based services to users. To provide the position-based services, positions of the users are to be determined firstly. Outdoors, the positions of the users may be determined by capturing GPS positioning signals using mobile phones of the users. However, indoors, the GPS signals cannot be captured or the GPS positioning precision is relatively low. Thus, it is required to achieve the indoor positioning of the users by use of other technologies. Nowadays, a common indoor positioning technology is to deploy Bluetooth-based beacons or Wi-Fi routers as anchor points and estimate a position of a user based on beacon or Wi-Fi position received by the mobile phone of the user. But, this technology requires deployment and maintenance of a large number of beacons, hardware of routers and related mapping relationship, leading to high investment costs and affecting promotion of use.

Considering the above defects, in this implementation, there is provided an indoor positioning method. In this method, when a mobile terminal can be determined as a positioning anchor point, the mobile terminal is taken as a beacon terminal to enable the beacon terminal to broadcast an anchor point position so as to provide positioning information to other mobile terminals. In the technical solution, a mobile terminal meeting anchor point requirements is taken as a beacon terminal to provide convenient positioning services, so as to avoid deployment and maintenance of a large number of beacons, hardware of routers and related mapping relationship, thus greatly reducing investment costs and facilitating promotion of use.

In an implementation of the embodiment, the mobile terminal refers to a mobile terminal carried by a user to request positioning services or provide positioning services, where the user may be human, robot, or another resource which is capable of operating the mobile terminal.

In an implementation of the embodiment, the state data of the mobile terminal may include one or more of a current time, a wireless communication device connection state, mobile terminal motion state, illumination data and magnetic field strength data.

A wireless communication device refers to a device such as Bluetooth and Wi-Fi router, which is capable of performing wireless communication with the mobile terminal. The wireless communication device connection state may include states such as unconnected, connected and being connected, etc. The mobile terminal motion state may include states such as motion and motionlessness, etc., which may be obtained by use of an accelerometer. When a value measured by the accelerometer is within a preset motion range, it is thought that the mobile terminal is in motion state and not suitable for broadcasting positioning information as a beacon terminal. When a value measured by the accelerometer is within a preset motionlessness range, it is thought that the mobile terminal is in motionless state and suitable for broadcasting positioning information as a beacon terminal. The preset motion range and the preset motionlessness range both may be set by those skilled in the art according to actual applications, which is not specifically defined herein. The illumination data is used to determine whether the mobile terminal is in an indoor environment or an outdoor environment; and the magnetic field strength data is used to assist in determining a position of the mobile terminal.

In order to improve the accuracy of the obtained state data of the mobile terminal, in an implementation of the embodiment, the state data of the mobile terminal may be obtained regularly based on a preset time interval, where the preset time interval may be determined according to positioning precision requirements of the actual applications. The specific value of the preset time interval is not specifically defined in the present disclosure.

In an implementation of the embodiment, based on a pre-trained position classification model, a position classification of the mobile terminal is determined according to the state data of the mobile terminal.

The position classification model is pre-trained based on obtained offline training data. When the position classification model is trained:

training data is firstly obtained, where the training data includes mobile device state data and mobile device position classification data corresponding to the mobile device state data.

In an implementation of the embodiment, obtaining the training data includes: obtaining the mobile device position classification data according to mobile device position-related data, where the mobile device position-related data includes one or more of mobile device positioning data such as GPS positioning data, mobile device payment data, mobile device transaction data, mobile device sign-in data and mobile device marking data. For example, the mobile device payment data may be used to obtain, through analysis, a location for accepting payment in which a mobile device performs payment operation, such as a merchant or shop or the like. Similarly, the mobile device transaction data may be used to obtain, through analysis, a location for performing transaction with a user in which a mobile device performs transaction operation, such as a merchant or shop or the like. The mobile device sign-in data may be used to obtain, through analysis, a location for sign-in verification in which a mobile device performs sign-in operation, such as a merchant, a shop, a company or an enterprise or the like. The mobile device marking data may be used to obtain, through analysis, a location for marking verification in which a mobile terminal performs marking operation, such as a merchant, a shop, a company or an enterprise or the like.

Furthermore, in an implementation of the embodiment, the mobile device position classification data may be obtained according to the mobile device position-related data in the following steps.

Firstly, according to the mobile device position-related data, one or more positions at which the mobile device has ever been present or has ever reached in history, i.e. mobile device historical presence positions, are determined, and the mobile device historical presence positions are taken as candidate anchor point positions.

Next, in order to improve the accuracy of the anchor point position, a more accurate target anchor point position is obtained by performing clustering for mobile device positioning data corresponding to the candidate anchor point positions, and the target anchor point position is taken as the mobile device position classification data. At this time, the mobile device position classification data and the mobile device state data corresponding to the mobile device position classification data form a state position matrix, i.e. the training data.

The clustering refers to a process in which a set of physical or abstract objects are divided into a plurality of classes consisting of similar objects. The clustering may be achieved in many manners and a proper clustering manner may be selected by those skilled in the art according to requirements of actual applications and characteristics of data to be clustered. For example, a K-Means clustering method may be selected. At this time, firstly, a preset number of classes may be determined, and their respective center points are randomly initialized, where the center point refers to a data point having same vector length to each mobile device positioning data point pre-assigned to a preset class; then, a distance from each other mobile device positioning data point to be clustered to the respective center point is calculated, and if the calculated distances indicate that the center point of a corresponding class in the preset number of classes is closest to the mobile device positioning data point, the mobile device positioning data point is assigned to the corresponding class; then, a new center point of each class is updated by calculation; the above steps are repeated until the distance between the center points obtained by each update of a respective class is smaller than a preset threshold, that is, the center point of the respective class is changed little, and a respective class obtained at this time is a clustering result.

According to a rule of travel of a user, generally, within half an hour after and before the user performs payment operation after reaching a merchant, the positioning data of the user is centralized at the merchant and in a case of exceeding half an hour, the user may be already far away from the merchant. Therefore, in order to avoid performing position clustering for the user who is already away from the merchant to result in loss of accuracy of the clustering result, clustering is performed on the mobile device positioning data within a preset time period during a clustering process in an implementation of the embodiment, where the preset time period may be determined according to characteristics of mobile device historical positioning data.

After the training data including the mobile device state data and the mobile device position classification data corresponding to the mobile device state data is obtained, a position classification model function is selected and then the position classification model is obtained by performing model training with the mobile device state data as input and the mobile device position classification data corresponding to the mobile device state data as output. The position classification model function may be selected according to requirements of actual applications, for example, a GBDT, KNN or neural network model function may be selected. The specific form of the position classification model function is not limited in the present disclosure.

Based on the above technical solution, a position which the user frequents and can be taken as an anchor point may be determined according to historical state data of the user mobile terminal and the mobile device position-related data, that is, the position classification data is determined, and then a relationship between state of the user mobile terminal and anchor point position is established according to the historical state data of the user mobile terminal.

In an implementation of the embodiment, if the position classifications of more one mobile terminals are anchor point positions, at this time, one or more mobile terminals thereof may be selected as beacon terminals according to the requirements of actual applications or all mobile terminals are taken as beacon terminals. When one or more mobile terminals thereof are selected as beacon terminals, the selection may be performed at random or performed according to a positional relationship of the several mobile terminals, a predicted time length of serving as an anchor point position, and a number of times or a frequency of presence at the anchor point position within a preset historical time period.

In an implementation of the embodiment, the step S102 in which the position classification of the mobile terminal is determined according to the state data of the mobile terminal based on the pre-trained position classification model includes:

obtaining a current position classification of the mobile terminal by inputting state information of the mobile terminal into the position classification model.

In this implementation, according to the state data of the user mobile terminal, the position classification of the user mobile terminal is determined, that is, whether the user mobile terminal is being at an anchor point position is determined. If yes, the user mobile terminal may be allowed to broadcast its own position as a beacon terminal subsequently so as to provide position information to other devices. The anchor point position refers to a position which does not change or changes little in a long preset time period, has position identifiability and can be taken as a reference position of other mobile terminals to assist in determining position information of other mobile terminals.

In an implementation of the embodiment, the anchor point position broadcast instruction at least includes identifier information of the anchor point position, such that anchor point position information broadcast by the beacon terminal at least includes the identifier information of the anchor point position. The identifier information of the anchor point position is used to uniquely identify the anchor point position, for example, the identifier information may be an anchor point ID which is correspondingly provided with one specific geographical position. In an implementation of the embodiment, the anchor point ID may be expressed as UUID-Major-Minor tuple.

In order to protect the position information of the mobile terminal as an anchor point, in an implementation of the embodiment, a correspondence between identifier information of the anchor point position, geographical position of the beacon terminal as an anchor point and identifier information of the beacon terminal is stored in a server end. When the beacon terminal broadcasts an anchor point position, the beacon terminal may only broadcast the identifier information of the anchor point position, and the mobile terminal receiving the anchor point position broadcast may further obtain the anchor point position based on the identifier information of the anchor point position.

Figure 2:
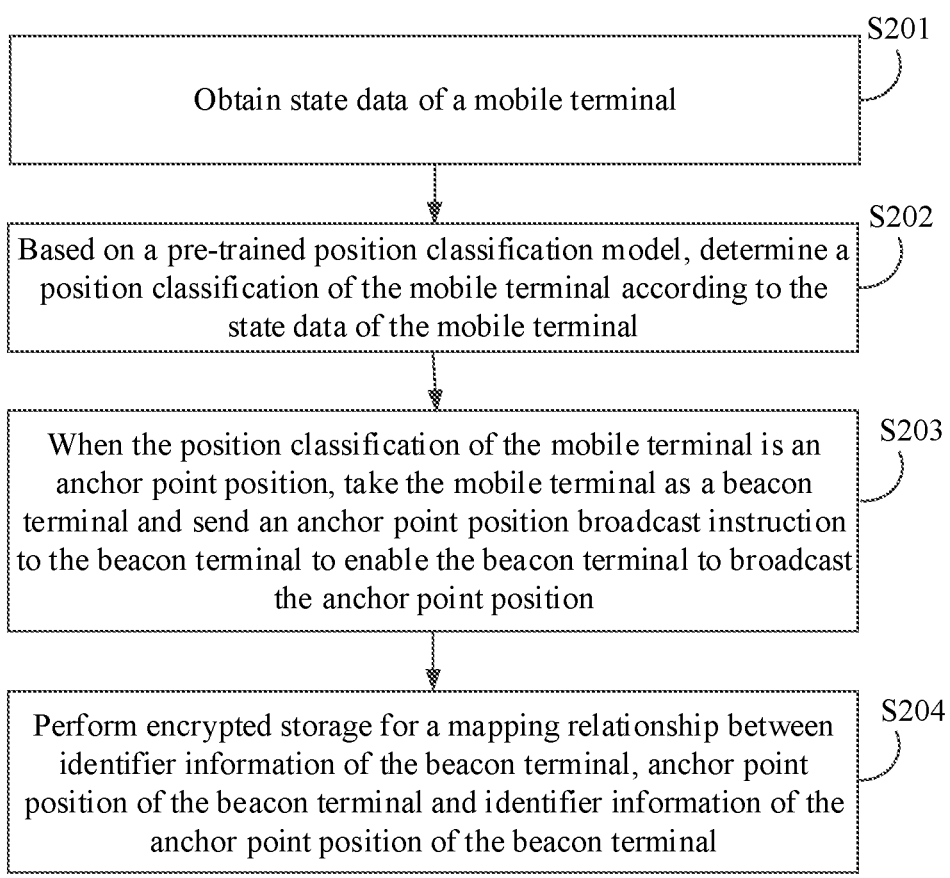

In order to further protect the position information of the mobile terminal as an anchor point, in an implementation of the embodiment, encrypted storage may also be performed for the correspondence between identifier information of the anchor point position, geographical position of the beacon terminal as an anchor point and identifier information of the beacon terminal. As shown in FIG. 2, the method may include the following steps S201 to S204.

At step S201, state data of a mobile terminal is obtained.

At step S202, based on a pre-trained position classification model, a position classification of the mobile terminal is determined according to the state data of the mobile terminal.

At step S203, when the position classification of the mobile terminal is an anchor point position, the mobile terminal is taken as a beacon terminal and an anchor point position broadcast instruction is sent to the beacon terminal to enable the beacon terminal to broadcast the anchor point position.

At step S204, encrypted storage is performed for a mapping relationship between identifier information of the beacon terminal, anchor point position of the beacon terminal and identifier information of the anchor point position of the beacon terminal.

In an implementation of the embodiment, the mapping relationship between identifier information of the beacon terminal, anchor point position of the beacon terminal and identifier information of the anchor point position of the beacon terminal may also be refreshed based on a preset period to further avoid leakage of user position information.

Figure 3:
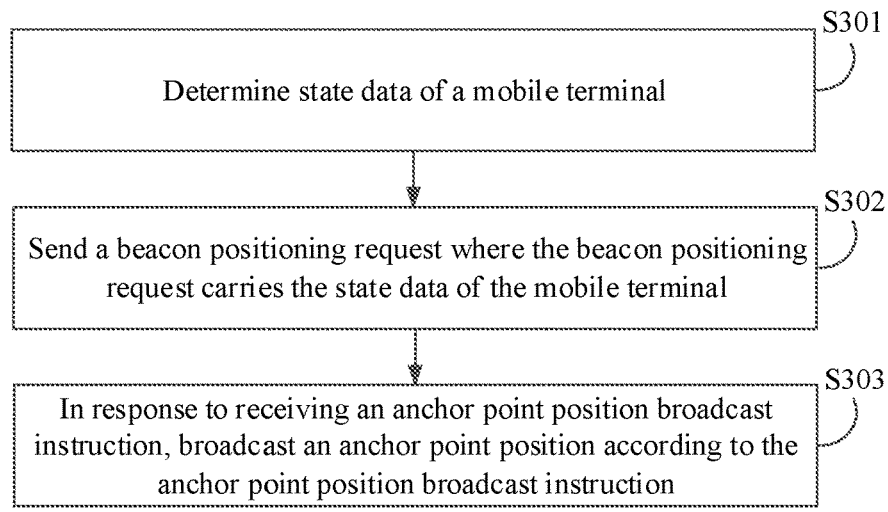

FIG. 3 is a flowchart illustrating an indoor positioning method according to another embodiment of the present disclosure. The indoor positioning method may be applied to a mobile terminal which may be taken as a beacon terminal.

As shown in FIG. 3, the indoor positioning method includes the following steps S301 to S303.

At step S301, state data of a mobile terminal is determined.

At step S302, a beacon positioning request is sent where the beacon positioning request carries the state data of the mobile terminal.

At step S303, in response to receiving an anchor point position broadcast instruction, an anchor point position is broadcast according to the anchor point position broadcast instruction.

As mentioned above, along with development of scientific technologies, in order to improve service quality, more and more merchants or service providers provide position-based services to users. To provide the position-based services, positions of the users are to be determined firstly. Outdoors, the positions of the users may be determined by capturing GPS positioning signals using mobile phones of the users. However, indoors, the GPS signals cannot be captured or the GPS positioning precision is relatively low. Thus, it is required to achieve the indoor positioning of the users by use of other technologies. Nowadays, a common indoor positioning technology is to deploy Bluetooth-based beacons or Wi-Fi routers as anchor points and estimate a position of a user based on beacon or Wi-Fi position received by the mobile phone of the user. But, this technology requires deployment and maintenance of a large number of beacons, hardware of routers and related mapping relationship, leading to high investment costs and affecting promotion of use.

Considering the above defects, in this implementation, there is provided an indoor positioning method. In this method, a beacon positioning request carrying the state data of the mobile terminal is sent to the server, and when the server determines that the mobile terminal can be taken as a positioning anchor point, an anchor point position is broadcast according to the anchor point position broadcast instruction sent by the server to provide positioning information to other mobile terminals. In the technical solution, a mobile terminal meeting anchor point requirements is taken as a beacon terminal to provide convenient positioning services, so as to avoid deployment and maintenance of a large number of beacons, hardware of routers and related mapping relationship, thus greatly reducing investment costs and facilitating promotion of use.

In an implementation of the embodiment, the state data of the mobile terminal includes one or more of a current time, a wireless communication device connection state, mobile terminal motion state, illumination data and magnetic field strength data.

In an implementation of the embodiment, the beacon positioning request may be completed by a software development kit (SDK) of an application program (APP) embedded in the mobile terminal.

In order to improve the accuracy of the state data of the mobile terminal, in an implementation of the embodiment, the beacon positioning request may be sent regularly based on a preset time interval, where, similar to the above descriptions, the preset time interval may be determined according to positioning accuracy requirements of the actual applications, and therefore its specific value will not be defined in the present disclosure.

In an implementation of the embodiment, the anchor point position broadcast instruction at least includes identifier information of the anchor point position, such that the anchor point position broadcast at least includes the identifier information of the anchor point position. The identifier information of the anchor point position is used to uniquely identify the anchor point position, for example, the identifier information may be an anchor point ID which is correspondingly provided with one specific geographical position. In an implementation of the embodiment, the anchor point ID may be expressed as UUID-Major-Minor tuple.

In order to protect the position information of the mobile terminal as an anchor point, in an implementation of the embodiment, a correspondence between identifier information of the anchor point position, geographical position of the beacon terminal as an anchor point and identifier information of the beacon terminal is stored in a server end. When the beacon terminal broadcasts an anchor point position, the beacon terminal may only broadcast the identifier information of the anchor point position, and the mobile terminal receiving the anchor point position broadcast may further obtain the anchor point position based on the identifier information of the anchor point position.

In order to further protect the position information of the mobile terminal as an anchor point, encrypted storage may also be performed for the correspondence between identifier information of the anchor point position, geographical position of the beacon terminal as an anchor point and identifier information of the beacon terminal. Furthermore, the mapping relationship between identifier information of the beacon terminal, anchor point position of the beacon terminal and identifier information of the anchor point position of the beacon terminal may also be refreshed based on a preset period to further avoid leakage of user position information.

In an implementation of the embodiment, the anchor point position broadcast may also be completed by a software development kit (SDK) of an application program (APP) embedded in the mobile terminal and achieved based on a corresponding beacon protocol.

It is noted that some of technical terms or technical features involved in FIG. 3 and relevant embodiments are identical or similar to the technical terms or technical features mentioned in the above embodiments and thus corresponding explanations and descriptions may be referred to the descriptions of the above embodiments, which will not be repeated herein.

Figure 4:
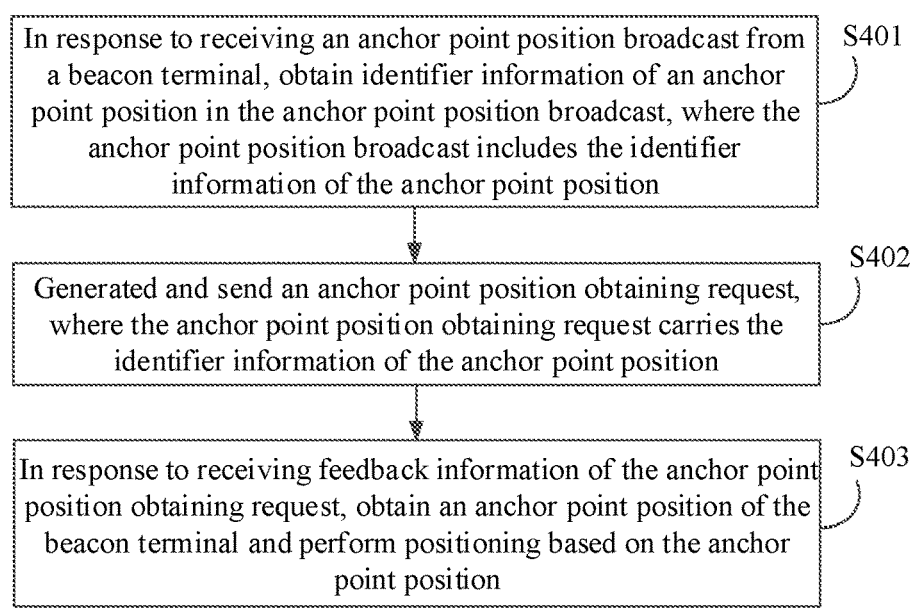

FIG. 4 is a flowchart illustrating an indoor positioning method according to another embodiment of the present disclosure. The indoor positioning method may be applied to a mobile terminal as a to-be-positioned terminal. As shown in FIG. 4, the indoor positioning method includes the following steps S401 to S403.

At step S401, in response to receiving an anchor point position broadcast from a beacon terminal, identifier information of an anchor point position in the anchor point position broadcast is obtained, where the anchor point position broadcast includes the identifier information of the anchor point position.

At step S402, an anchor point position obtaining request is generated and sent, where the anchor point position obtaining request carries the identifier information of the anchor point position.

At step S403, in response to receiving feedback information of the anchor point position obtaining request, an anchor point position of the beacon terminal is obtained and positioning is performed based on the anchor point position.

As mentioned above, along with development of scientific technologies, in order to improve service quality, more and more merchants or service providers provide position-based services to users. To provide the position-based services, positions of the users are to be determined firstly. Outdoors, the positions of the users may be determined by capturing GPS positioning signals using mobile phones of the users. However, indoors, the GPS signals cannot be captured or the GPS positioning precision is relatively low. Thus, it is required to achieve the indoor positioning of the users by use of other technologies. Nowadays, a common indoor positioning technology is to deploy Bluetooth-based beacons or Wi-Fi routers as anchor points and estimate a position of a user based on beacon or Wi-Fi position received by the mobile phone of the user. But, this technology requires deployment and maintenance of a large number of beacons, hardware of routers, and related mapping relationship, leading to high investment costs and affecting promotion of use.

Considering the above defects, in this implementation, there is provided an indoor positioning method. In this method, after an anchor point position broadcast is received from a beacon terminal, an anchor point position obtaining request is generated based on the identifier information of the anchor point position obtained therefrom and then sent to the server; after the feedback information of the anchor point position obtaining request is received from the server, the anchor point position of the beacon terminal is obtained and finally positioning is performed based on the anchor point position. In the technical solution, a mobile terminal meeting anchor point requirements is taken as a beacon terminal to provide convenient positioning services, so as to avoid deployment and maintenance of a large number of beacons, hardware of routers and related mapping relationship, thus greatly reducing investment costs and facilitating promotion of use.

The identifier information of the anchor point position is used to uniquely identify the anchor point position where the beacon terminal is located, for example, the identifier information may be an anchor point ID which is correspondingly provided with one specific geographical position. In an implementation of the embodiment, the anchor point ID may be expressed as UUID-Major-Minor tuple.

In an implementation of the embodiment, the anchor point position obtaining request may be completed by a software development kit (SDK) of an application program (APP) embedded in the mobile terminal.

As mentioned above, in order to protect the position information of the mobile terminal as an anchor point, a correspondence between identifier information of the anchor point position, geographical position of the beacon terminal as an anchor point and identifier information of the beacon terminal is stored in a server end. Therefore, when the beacon terminal broadcasts an anchor point position, the beacon terminal may only broadcast the identifier information of the anchor point position. In this case, the mobile terminal receiving the anchor point position broadcast needs to generate an anchor point position obtaining request according to the received identifier information of the anchor point position and send it to the server, which may determine the anchor point position of the beacon terminal corresponding to the identifier information of the anchor point position based on the above correspondence and feed it back to the mobile terminal. In this way, the mobile terminal may perform positioning based on the received anchor point position of the beacon terminal.

In an implementation of the embodiment, the step S403 in which positioning is performed based on the anchor point position includes:

determining signal transmission direction and strength of the beacon terminal;

determining a positional relationship with the beacon terminal according to the signal transmission direction and strength;

determining a position of the mobile terminal according to the positional relationship with the beacon terminal and the anchor point position of the beacon terminal.

The signal transmission direction and strength of the beacon terminal may be determined by the mobile terminal. A positional relationship between mobile terminal and beacon terminal may be determined based on the signal transmission direction and strength. Further, the position of the mobile terminal can be determined according to the anchor point position of the beacon terminal and the positional relationship between mobile terminal and beacon terminal.

It is noted that some of technical terms or technical features involved in FIG. 4 and relevant embodiments are identical or similar to the technical terms or technical features mentioned in the above embodiments and thus corresponding explanations and descriptions may be referred to the descriptions of the above embodiments, which will not be repeated herein.

An apparatus embodiment of the present disclosure is described below and may be used to implement the method embodiment of the present disclosure.

Figure 5:
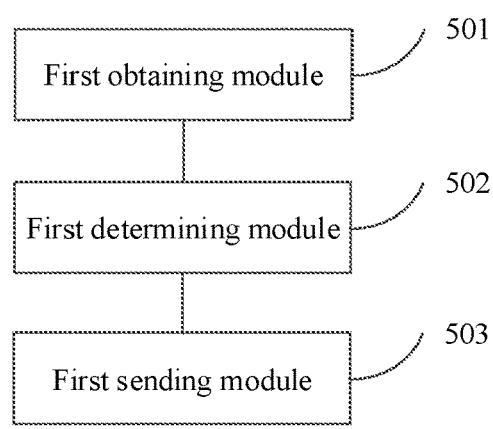
FIG. 5 to FIG. 8 are structural block diagrams illustrating indoor positioning apparatuses according to different embodiments of the present disclosure.

FIG. 5 is a structural block diagram illustrating an indoor positioning apparatus according to an embodiment of the present disclosure. The apparatus may be implemented as part or all of an electronic device by software, hardware or combination thereof, for example, may be implemented as a server end. As shown in FIG. 5, the indoor positioning apparatus includes:

a first obtaining module 501, configured to obtain state data of a mobile terminal;

a first determining module 502, configured to determine a position classification of the mobile terminal according to the state data of the mobile terminal based on a pre-trained position classification model;

a first sending module 503, configured to, when the position classification of the mobile terminal is an anchor point position, take the mobile terminal as a beacon terminal and send an anchor point position broadcast instruction to the beacon terminal to enable the beacon terminal to broadcast an anchor point position.

As mentioned above, along with development of scientific technologies, in order to improve service quality, more and more merchants or service providers provide position-based services to users. To provide the position-based services, positions of the users are to be determined firstly. Outdoors, the positions of the users may be determined by capturing GPS positioning signals using mobile phones of the users. However, indoors, the GPS signals cannot be captured or the GPS positioning precision is relatively low. Thus, it is required to achieve the indoor positioning of the users by use of other technologies. Nowadays, a common indoor positioning technology is to deploy Bluetooth-based beacons or Wi-Fi routers as anchor points and estimate a position of a user based on beacon or Wi-Fi position received by the mobile phone of the user. But, this technology requires deployment and maintenance of a large number of beacons, hardware of routers, and related mapping relationship, leading to high investment costs and affecting promotion of use.

Considering the above defects, in this implementation, there is provided an indoor positioning apparatus. When determining that a mobile terminal can be taken as a positioning anchor point, the apparatus takes the mobile terminal as a beacon terminal and enables it to broadcast an anchor point position to provide positioning information to other mobile terminals. In this technical solution, a mobile terminal meeting anchor point requirements is taken as a beacon terminal to provide convenient positioning services, so as to avoid deployment and maintenance of a large number of beacons, hardware of routers, and related mapping relationship, thus greatly reducing investment costs and facilitating promotion of use.

In an implementation of the embodiment, the mobile terminal refers to a mobile terminal carried by a user to request positioning services or provide positioning services, where the user may be human, robot, or another resource which is capable of operating the mobile terminal.

In an implementation of the embodiment, the state data of the mobile terminal comprises one or more of a current time, a wireless communication device connection state, mobile terminal motion state, illumination data and magnetic field strength data.

A wireless communication device refers to a device such as Bluetooth and Wi-Fi router, which is capable of performing wireless communication with the mobile terminal. The wireless communication device connection state may include states such as unconnected, connected and being connected, etc. The mobile terminal motion state may include states such as motion and motionlessness, etc., which may be obtained by use of an accelerometer. When a value measured by the accelerometer is within a preset motion range, it is thought that the mobile terminal is in motion state and not suitable for broadcasting positioning information as a beacon terminal. When a value measured by the accelerometer is within a preset motionlessness range, it is thought that the mobile terminal is in motionless state and suitable for broadcasting positioning information as a beacon terminal. The preset motion range and the preset motionlessness range both may be set by those skilled in the art according to actual applications, which is not specifically defined herein. The illumination data is used to determine whether the mobile terminal is in an indoor environment or an outdoor environment; and the magnetic field strength data is used to assist in determining a position of the mobile terminal.

In order to improve the accuracy of the obtained state data of the mobile terminal, in an implementation of the embodiment, the first obtaining module 501 may obtain the state data of the mobile terminal regularly based on a preset time interval, where the preset time interval may be determined according to positioning precision requirements of actual applications and its specific value is not limited herein.

In an implementation of the embodiment, the first determining module 502 determines a position classification of the mobile terminal according to the state data of the mobile terminal based on a pre-trained position classification model.

The position classification model is pre-trained based on obtained offline training data. When the position classification model is trained:

training data is firstly obtained, where the training data includes mobile device state data and mobile device position classification data corresponding to the mobile device state data.

In an implementation of the embodiment, obtaining the training data includes: obtaining the mobile device position classification data according to mobile device position-related data, where the mobile device position-related data includes one or more of mobile device positioning data such as GPS positioning data, mobile device payment data, mobile device transaction data, mobile device sign-in data and mobile device marking data. For example, the mobile device payment data may be used to obtain, through analysis, a location for accepting payment in which a mobile device performs payment operation, such as a merchant or shop or the like. Similarly, the mobile device transaction data may be used to obtain, through analysis, a location for performing transaction with a user in which a mobile device performs transaction operation, such as a merchant or shop or the like. The mobile device sign-in data may be used to obtain, through analysis, a location for sign-in verification in which a mobile device performs sign-in operation, such as a merchant, a shop, a company or an enterprise or the like. The mobile device marking data may be used to obtain, through analysis, a location for marking verification in which a mobile terminal performs marking operation, such as a merchant, a shop, a company or an enterprise or the like.

Furthermore, in an implementation of the embodiment, the mobile device position classification data may be obtained according to the mobile device position-related data in the following steps.

Firstly, according to the mobile device position-related data, one or more determined positions at which the mobile device has ever been present or has ever reached in history, i.e. mobile device historical presence positions, are determined, and the mobile device historical presence positions are taken as candidate anchor point positions.

Next, in order to improve the accuracy of the anchor point position, a more accurate target anchor point position is obtained by performing clustering for mobile device positioning data corresponding to the candidate anchor point positions, and the target anchor point position is taken as the mobile device position classification data. At this time, the mobile device position classification data and the mobile device state data corresponding to the mobile device position classification data form a state position matrix, i.e. the training data.

The clustering refers to a process in which a set of physical or abstract objects are divided into a plurality of classes consisting of similar objects. The clustering may be achieved in many manners and a proper clustering manner may be selected by those skilled in the art according to requirements of actual applications and characteristics of data to be clustered. For example, a K-Means clustering method may be selected. At this time, firstly, a preset number of classes may be determined, and their respective center points are randomly initialized, where the center point refers to a data point having same vector length to each mobile device positioning data point pre-assigned to a preset class; then, a distance from each other mobile device positioning data point to be clustered to the respective center point is calculated, and if the calculated distances indicate that the center point of a corresponding class in the preset number of classes is closest to the mobile device positioning data point, the mobile device positioning data point is assigned to the corresponding class; then, a new center point of each class is updated by calculation; the above steps are repeated until the distance between the center points obtained by each update of a respective class is smaller than a preset threshold, that is, the center point of the respective class is changed little, and a respective class obtained at this time is a clustering result.

According to a rule of travel of a user, generally, within half an hour after and before the user performs payment operation after reaching a merchant, the positioning data of the user is centralized at the merchant and in a case of exceeding half an hour, the user may be already far away from the merchant. Therefore, in order to avoid performing position clustering for the user who is already away from the merchant to result in loss of accuracy of the clustering result, clustering is performed on the mobile device positioning data within a preset time period during a clustering process in an implementation of the embodiment, where the preset time period may be determined according to characteristics of mobile device historical positioning data.

After the training data including the mobile device state data and the mobile device position classification data corresponding to the mobile device state data is obtained, a position classification model function is selected and then the position classification model is obtained by performing model training with the mobile device state data as input and the mobile device position classification data corresponding to the mobile device state data as output. The position classification model function may be selected according to requirements of actual applications, for example, a GBDT, KNN or neural network model function may be selected. The specific form of the position classification model function is not limited in the present disclosure.

Based on the above technical solution, a position which the user frequents and can be taken as an anchor point may be determined according to historical state data of the user mobile terminal and the mobile device position-related data, that is, the position classification data is determined, and then a relationship between state of the user mobile terminal and anchor point position is established according to the historical state data of the user mobile terminal.

In an implementation of the embodiment, if the position classifications of more one mobile terminals are anchor point positions, at this time, one or more mobile terminals thereof may be selected as beacon terminals according to the requirements of actual applications or all mobile terminals are taken as beacon terminals. When one or more mobile terminals thereof are selected as beacon terminals, the selection may be performed at random or performed according to a positional relationship of the several mobile terminals, a predicted time length of serving as an anchor point position, and a number of times or a frequency of presence at the anchor point position within a preset historical time period.

In an implementation of the embodiment, the first determining module 502 may be configured to:

obtain a current position classification of the mobile terminal by inputting state information of the mobile terminal into the position classification model.

In this implementation, according to the state data of the user mobile terminal, the position classification of the user mobile terminal is determined, that is, whether the user mobile terminal is being at an anchor point position is determined. If yes, the user mobile terminal may be allowed to broadcast its own position as a beacon terminal subsequently so as to provide position information to other devices. The anchor point position refers to a position which does not change or changes little in a long preset time period, has position identifiability and can be taken as a reference position of other mobile terminals to assist in determining position information of other mobile terminals.

In an implementation of the embodiment, the anchor point position broadcast instruction at least includes identifier information of the anchor point position, such that anchor point position information broadcast by the beacon terminal at least includes the identifier information of the anchor point position. The identifier information of the anchor point position is used to uniquely identify the anchor point position, for example, the identifier information may be an anchor point ID which is correspondingly provided with one specific geographical position. In an implementation of the embodiment, the anchor point ID may be expressed as UUID-Major-Minor tuple.

In order to protect the position information of the mobile terminal as an anchor point, in an implementation of the embodiment, a correspondence of the identifier information of the anchor point position, the geographical position of the beacon terminal as an anchor point and the identifier information of the beacon terminal is stored in a server end. When the beacon terminal broadcasts an anchor point position, the beacon terminal may only broadcast the identifier information of the anchor point position, and the mobile terminal receiving the anchor point position broadcast may further obtain the anchor point position based on the identifier information of the anchor point position.

Figure 6:
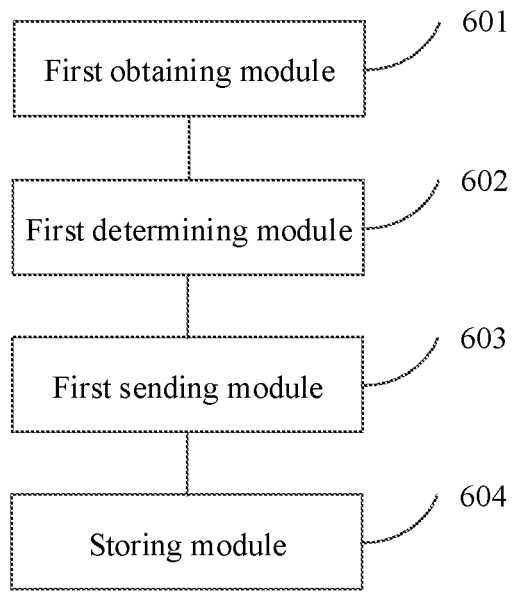

In order to further protect the position information of the mobile terminal as an anchor point, in an implementation of the embodiment, encrypted storage may also be performed for the correspondence of the identifier information of the anchor point position, the geographical position of the beacon terminal as an anchor point and the identifier information of the beacon terminal. As shown in FIG. 6, the apparatus includes:
- a first obtaining module 601, configured to obtain state data of a mobile terminal;
- a first determining module 602, configured to determine a position classification of the mobile terminal according to the state data of the mobile terminal based on a pre-trained position classification model;
- a first sending module 603, configured to, when the position classification of the mobile terminal is an anchor point position, take the mobile terminal as a beacon terminal and send an anchor point position broadcast instruction to the beacon terminal to enable the beacon terminal to broadcast an anchor point position;
- a storing module 604, configured to perform encrypted storage for a mapping relationship between identifier information of the beacon terminal, anchor point position of the beacon terminal, and identifier information of the anchor point position of the beacon terminal.

In an implementation of the embodiment, the mapping relationship of the identifier information of the beacon terminal, the anchor point position of the beacon terminal and the identifier information of the anchor point position of the beacon terminal may also be refreshed based on a preset period to further avoid leakage of user position information.

Figure 7:
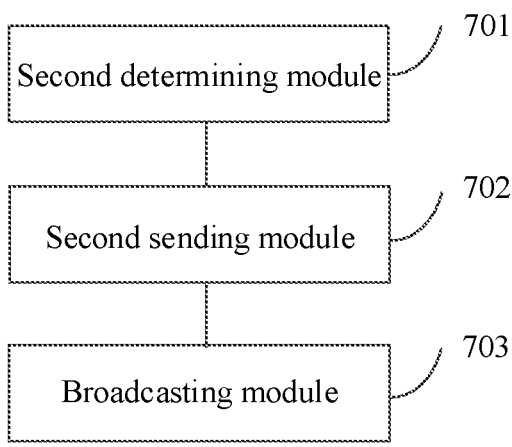

FIG. 7 is a structural block diagram illustrating an indoor positioning apparatus according to another embodiment of the present disclosure. The apparatus may be implemented as part or all of an electronic device by software, hardware or combination thereof, for example, may be implemented as a mobile terminal as a beacon terminal. As shown in FIG. 7, the indoor positioning apparatus includes:
- a second determining module 701, configured to determine state data of a mobile terminal;
- a second sending module 702, configured to send a beacon positioning request, wherein the beacon positioning request carries the state data of the mobile terminal;
- a broadcasting module 703, configured to, in response to receiving an anchor point position broadcast instruction, broadcast an anchor point position based on the anchor point position broadcast instruction.

As mentioned above, along with development of scientific technologies, in order to improve service quality, more and more merchants or service providers provide position-based services to users. To provide the position-based services, positions of the users are to be determined firstly. Outdoors, the positions of the users may be determined by capturing GPS positioning signals using mobile phones of the users. However, indoors, the GPS signals cannot be captured or the GPS positioning precision is relatively low. Thus, it is required to achieve the indoor positioning of the users by use of other technologies. Nowadays, a common indoor positioning technology is to deploy Bluetooth-based beacons or Wi-Fi routers as anchor points and estimate a position of a user based on beacon or Wi-Fi position received by the mobile phone of the user. But, this technology requires deployment and maintenance of a large number of beacons, hardware of routers, and related mapping relationship, leading to high investment costs and affecting promotion of use.

Considering the above defects, in this implementation, there is provided an indoor positioning apparatus. When the apparatus sends a beacon positioning request carrying the state data of the mobile terminal to a server and when the server determines the mobile terminal can be taken as a positioning anchor point, the apparatus broadcasts an anchor point position according to the anchor point position broadcast instruction sent by the server, so as to provide positioning information to other mobile terminals. In the technical solution, a mobile terminal meeting anchor point requirements is taken as a beacon terminal to provide convenient positioning services, so as to avoid deployment and maintenance of a large number of beacons, hardware of routers, and related mapping relationship, thus greatly reducing investment costs and facilitating promotion of use.

In an implementation of the embodiment, the state data of the mobile terminal includes one or more of a current time, a wireless communication device connection state, mobile terminal motion state, illumination data and magnetic field strength data.

In an implementation of the embodiment, the beacon positioning request may be completed by a software development kit (SDK) of an application program (APP) embedded in the mobile terminal.

In order to improve the accuracy of the state data of the mobile terminal, in an implementation of the embodiment, the second sending module 702 may send the beacon positioning request regularly based on a preset time interval, where, similar to the above descriptions, the preset time interval may be determined according to positioning accuracy requirements of the actual applications, and therefore its specific value will not be defined in the present disclosure.

In an implementation of the embodiment, the anchor point position broadcast instruction at least includes identifier information of the anchor point position, such that anchor point position broadcast at least includes the identifier information of the anchor point position. The identifier information of the anchor point position is used to uniquely identify the anchor point position, for example, the identifier information may be an anchor point ID which is correspondingly provided with one specific geographical position. In an implementation of the embodiment, the anchor point ID may be expressed as UUID-Major-Minor tuple.

In order to protect the position information of the mobile terminal as an anchor point, in an implementation of the embodiment, a correspondence of the identifier information of the anchor point position, the geographical position of the beacon terminal as an anchor point and the identifier information of the beacon terminal is stored in a server end. When the beacon terminal broadcasts an anchor point position, the beacon terminal may only broadcast the identifier information of the anchor point position, and the mobile terminal receiving the anchor point position broadcast may further obtain the anchor point position based on the identifier information of the anchor point position.

In order to further protect the position information of the mobile terminal as an anchor point, encrypted storage may also be performed for the correspondence of the identifier information of the anchor point position, the geographical position of the beacon terminal as an anchor point and the identifier information of the beacon terminal. Furthermore, the mapping relationship of the identifier information of the beacon terminal, the anchor point position of the beacon terminal and the identifier information of the anchor point position of the beacon terminal may also be refreshed based on a preset period to further avoid leakage of user position information.

In an implementation of the embodiment, the anchor point position broadcast may also be completed by a software development kit (SDK) of an application program (APP) embedded in the mobile terminal and achieved based on a corresponding beacon protocol.

It is noted that some of technical terms or technical features involved in FIG. 7 and relevant embodiments are identical or similar to the technical terms or technical features mentioned in the above embodiments and thus corresponding explanations and descriptions may be referred to the descriptions of the above embodiments, which will not be repeated herein.

Figure 8:
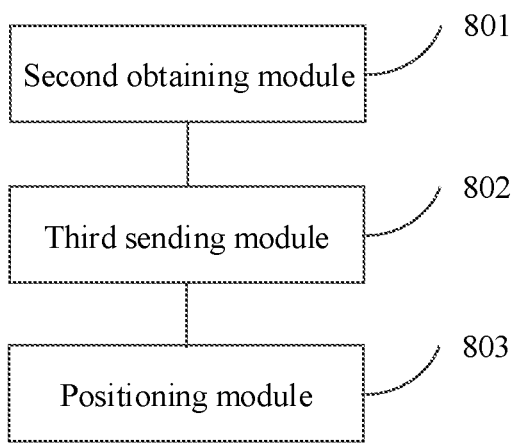

FIG. 8 is a structural block diagram illustrating an indoor positioning apparatus according to still another embodiment of the present disclosure. The apparatus may be implemented as part or all of an electronic device by software, hardware or combination thereof, for example, may be implemented as a mobile terminal as a to-be-positioned terminal. As shown in FIG. 8, the indoor positioning apparatus includes:

a second obtaining module 801, configured to, in response to receiving an anchor point position broadcast from a beacon terminal, obtain identifier information of an anchor point position in the anchor point position broadcast;

a third sending module 802, configured to generate and send an anchor point position obtaining request, wherein the anchor point position obtaining request carries the identifier information of the anchor point position;

a positioning module 803, configured to, in response to receiving feedback information of the anchor point position obtaining request, obtain an anchor point position of the beacon terminal and perform positioning based on the anchor point position.

As mentioned above, along with along with development of scientific technologies, in order to improve service quality, more and more merchants or service providers provide position-based services to users. To provide the position-based services, positions of the users are to be determined firstly. Outdoors, the positions of the users may be determined by capturing GPS positioning signals using mobile phones of the users. However, indoors, the GPS signals cannot be captured or the GPS positioning precision is relatively low. Thus, it is required to achieve the indoor positioning of the users by use of other technologies. Nowadays, a common indoor positioning technology is to deploy Bluetooth-based beacons or Wi-Fi routers as anchor points and estimate a position of a user based on beacon or Wi-Fi position received by the mobile phone of the user. But, this technology requires deployment and maintenance of a large number of beacons, hardware of routers, and related mapping relationship, leading to high investment costs and affecting promotion of use.

Considering the above defects, in this implementation, there is provided an indoor positioning apparatus. After receiving an anchor point broadcast from a beacon terminal, the apparatus generates an anchor point position obtaining request based on the identifier information of the anchor point position obtained therefrom and sends it to a server, and then obtains an anchor point position of the beacon terminal after receiving feedback information of the anchor point position obtaining request from the server, and finally performs positioning based on the anchor point position. In the technical solution, a mobile terminal meeting anchor point requirements is taken as a beacon terminal to provide convenient positioning services, so as to avoid deployment and maintenance of a large number of beacons, hardware of routers, and related mapping relationship, thus greatly reducing investment costs and facilitating promotion of use.

The identifier information of the anchor point position is used to uniquely identify the anchor point position where the beacon terminal is located, for example, the identifier information may be an anchor point ID which is correspondingly provided with one specific geographical position. In an implementation of the embodiment, the anchor point ID may be expressed as UUID-Major-Minor tuple.

In an implementation of the embodiment, the anchor point position obtaining request may be completed by a software development kit (SDK) of an application program (APP) embedded in the mobile terminal.

As mentioned above, in order to protect the position information of the mobile terminal as an anchor point, a correspondence of the identifier information of the anchor point position, the geographical position of the beacon terminal as an anchor point and the identifier information of the beacon terminal is stored in a server end. Therefore, when the beacon terminal broadcasts an anchor point position, the beacon terminal may only broadcast the identifier information of the anchor point position. In this case, the mobile terminal receiving the anchor point position broadcast needs to generate an anchor point position obtaining request according to the received identifier information of the anchor point position and send it to the serve, which may determine the anchor point position of the beacon terminal corresponding to the identifier information of the anchor point position based on the above correspondence and feed it back to the mobile terminal. In this way, the mobile terminal may perform positioning based on the received anchor point position of the beacon terminal.

In an implementation of the embodiment, a part used to perform positioning based on the anchor point position in the positioning module 803 is configured to:

determine signal transmission direction and strength of the beacon terminal;

determine a positional relationship with the beacon terminal according to the signal transmission direction and strength;

determine a position of the mobile terminal according to the positional relationship with the beacon terminal and the anchor point position of the beacon terminal.

The signal transmission direction and strength of the beacon terminal may be determined by the mobile terminal. A positional relationship between the mobile terminal and the beacon terminal may be determined based on the signal transmission direction and strength. Further, the position of the mobile terminal can be determined according to the anchor point position of the beacon terminal and the positional relationship between the mobile terminal and the beacon terminal.

It is noted that some of technical terms or technical features involved in FIG. 8 and relevant embodiments are identical or similar to the technical terms or technical features mentioned in the above embodiments and thus corresponding explanations and descriptions may be referred to the descriptions of the above embodiments, which will not be repeated herein.

One application scenario is given below to help understand the technical solution of the present disclosure better.

In this application scenario, a mobile terminal which frequently appears in one or more fixed locations sends its state data to a server regularly to request serving as a beacon terminal. After receiving the state data of the requesting mobile terminal, the server determines whether a position of the requesting mobile terminal can be taken as an anchor point position and whether the requesting mobile terminal can be taken as a beacon terminal. If yes, the server may send an anchor point position broadcast instruction carrying an anchor point position ID to the beacon terminal to enable the beacon terminal to broadcast an anchor point position, where the broadcast contents at least include the anchor point position ID. After receiving the anchor point position broadcast, other mobile terminals to be positioned obtain identifier information of the anchor point position and then generate an anchor point position obtaining request based on the identifier information of the anchor point position and send it to the server. The server determines an anchor point position of the beacon terminal corresponding to the anchor point position ID by querying for a pre-stored correspondence between anchor point position ID, geographical position of the beacon terminal as an anchor point and identifier information of the beacon terminal, and feeds the anchor point position of the beacon terminal back to the mobile terminal to be positioned. The mobile terminal to be positioned determines a positional relationship with the beacon terminal based on received signal transmission direction and strength of the beacon terminal and finally determines a position where the mobile terminal to be positioned is located according to the positional relationship with the beacon terminal and the anchor point position of the beacon terminal, thus achieving accurate indoor positioning.

Figure 9:
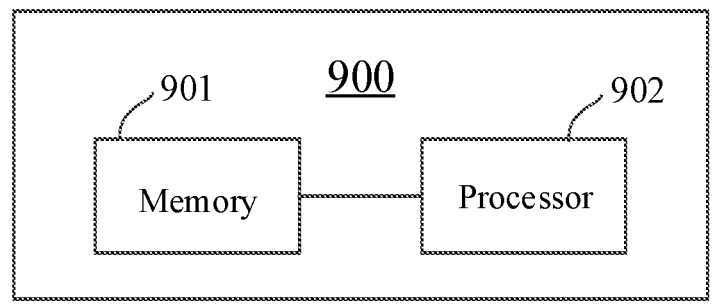
FIG. 9 is a structural block diagram illustrating an electronic device according to an embodiment of the present disclosure.

The present disclosure further provides an electronic device. FIG. 9 is a structural block diagram illustrating an electronic device according to an embodiment of the present disclosure. As shown in FIG. 9, the electronic device 900 includes a memory 901 and a processor 602, where, the memory 901 is configured to store one or more computer instructions, where the one or more computer instructions are executed by the processor 902 to implement the steps of the above methods.

Figure 10:
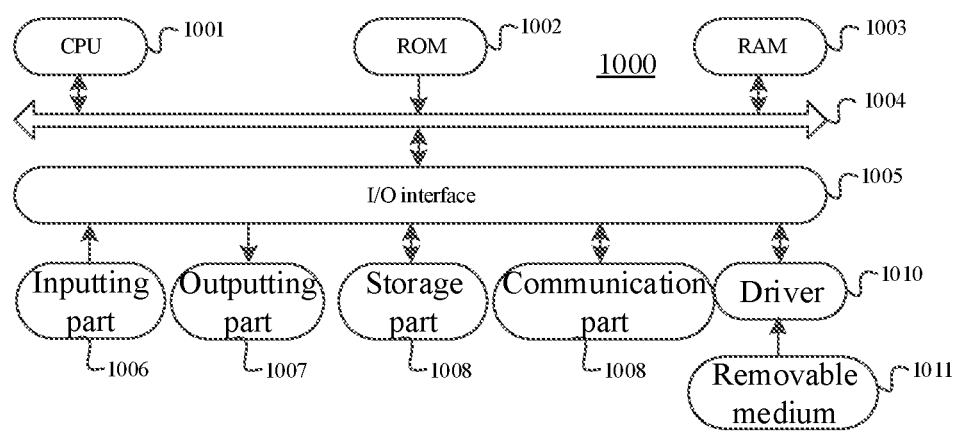
FIG. 10 is a structural schematic diagram illustrating a computer system suitable for implementing an indoor positioning method according to an embodiment of the present disclosure.

FIG. 10 is a structural schematic diagram illustrating a computer system suitable for implementing an indoor positioning method according an embodiment of the present disclosure.

As shown in 10, the computer system 1000 includes a central processing unit (CPU) 1001, which may perform various processing of the above embodiments according to programs stored in a read only memory (ROM) 1002 or programs loaded to a random access memory (RAM) 1003 from a storage part 1008. In the RAM1003, various programs and data required for operations of the system 1000 are also stored. CPU1001, ROM1002 and RAM1003 are connected with each other via a bus 1004. An input/output (I/O) interface 1005 is also connected to the bus 1004.

The following components are connected to the I/O interface 1005: an inputting part 1006 including keyboard and mouse, etc.; an outputting part 1007 including such as cathode ray tube (CRT), liquid crystal display (LCD) and loudspeaker and the like; a storage part 1008 including hard disk, etc.; and a communication part 1009 including, for example, LAN card and network interface card such as modem. The communication part 1009 executes communications via a network such as internet. A driver 1010 may also be connected to the I/O interface 1005 as required. A removable medium 1011 such as magnetic disk, compact disk, magneto-optical disk and semiconductor memory may be installed on the driver 1010 such that computer programs read therefrom are installed on the storage part 1008 as required.

Particularly, according to the embodiments of the present disclosure, the methods described above may be implemented as computer software programs. For example, the embodiments of the present disclosure include a computer program product including computer programs tangibly contained in its readable medium. The computer programs contain program codes for performing the above indoor positioning method. In this implementation, the computer programs may be downloaded and installed from network through the communication part 1009, and/or installed from the removable medium 1011.

The flowcharts and block diagrams in the accompanying drawings show system architectures, functions and operations implemented by systems, methods and computer program products of various embodiments of the present disclosure. In this point, each block in the flowcharts or block diagrams may represent one part of a module, program segment or codes, where the module, program segment or codes may include one or more executable instructions for implementing the specified logic functions. It also should be noted that in some alternative implementations, the functions marked in the blocks may also be performed in a sequence different from that marked in the accompanying drawings. For example, two continuous blocks can be basically performed in parallel or sometimes may be performed in a reverse sequence depending on functions involved. It is also noted that each block in block diagrams and/or flowcharts and combinations of blocks of block diagrams and/or flowcharts may be implemented by a dedicated hardware-based system for performing specified functions or operations, or by combination of dedicated hardware and computer instructions.

Units or modules involved in the descriptions of the embodiments of the present disclosure may be implemented by software, or hardware. The described units or modules may also be disposed in a processor and the names of these units and modules do not constitute any limitation to the units or modules themselves in some circumstances.

As another aspect, the present disclosure further provides a computer readable storage medium. The computer readable storage medium may be a computer readable storage medium involved in the apparatus of the embodiments of the present disclosure, or a computer readable storage medium present separately and unassembled into devices. The computer readable storage medium stores one or more programs which are executed by one or more processors to implement the method described in the present disclosure.

The above descriptions are merely made to the preferred embodiments of the present disclosure and the technical principles employed therein. Those skilled in the art should understand that the scope of protection of the present disclosure is not limited to the technical solutions formed by specific combinations of the above technical features, and should also cover other technical solutions formed by any combinations of the above technical features or equivalent technical features without departing from the inventive thought, for example, those technical solutions formed by mutual replacement of the above features and the technical features having similar functions provided in (not limited to) the present disclosure.

What is claimed is:

1. An indoor positioning method, comprising:
   obtaining state data of a mobile terminal;
   based on a pre-trained position classification model, determining a position classification of the mobile terminal according to the state data of the mobile terminal;
   when the position classification of the mobile terminal is an anchor point position, taking the mobile terminal as a beacon terminal and sending an anchor point position broadcast instruction to the beacon terminal to enable the beacon terminal to broadcast the anchor point position.

2. The indoor positioning method of claim 1, wherein the state data of the mobile terminal comprises one or more of a current time, a wireless communication device connection state, mobile terminal motion state, illumination data and magnetic field strength data.

3. The indoor positioning method of claim 1, wherein the obtaining the state data of the mobile terminal specifically comprises: obtaining the state data of the mobile terminal regularly based on a preset time interval.

4. The indoor positioning method of claim 1, wherein training of the position classification model comprises:
   obtaining training data, wherein the training data comprises mobile device state data, and mobile device position classification data corresponding to the mobile device state data;
   obtaining the position classification model by performing model training with the mobile device state data as input and the mobile device position classification data corresponding to the mobile device state data as output.

5. The indoor positioning method of claim 4, wherein obtaining the training data comprises: obtaining the mobile device position classification data according to mobile device position-related data, wherein the mobile device position-related data comprises one or more of mobile device positioning data, mobile device payment data, mobile device transaction data, mobile device sign-in data and mobile device marking data.

6. The indoor positioning method of claim 5, wherein obtaining the mobile device position classification data according to the mobile device position-related data comprises:
   determining one or more mobile device historical presence positions according to the mobile device position-related data and taking the mobile device historical presence positions as candidate anchor point positions;
   obtaining a target anchor point position by performing clustering for mobile device positioning data corresponding to the candidate anchor point positions, and taking the target anchor point position as the mobile device position classification data.

7. The indoor positioning method of claim 1, wherein the anchor point position broadcast instruction at least comprises identifier information of the anchor point position, such that anchor point position information broadcast by the beacon terminal at least comprises the identifier information of the anchor point position.

8. The indoor positioning method of claim 1, further comprising:
   performing encrypted storage for a mapping relationship between identifier information of the beacon terminal, anchor point position of the beacon terminal, and identifier information of the anchor point position of the beacon terminal.

9. An electronic device, comprising a memory and a processor, wherein the memory is configured to store one or more computer instructions, wherein the one or more computer instructions are executed by the processor to implement the steps of the method according to claim 1.

10. A non-transitory computer readable storage medium, storing computer instructions thereon, wherein the computer instructions are executed by a processor to implement the steps of the method according to claim 1.

11. An indoor positioning method, comprising:
    determining state data of a mobile terminal;
    sending a beacon positioning request, wherein the beacon positioning request carries the state data of the mobile terminal;
    in response to receiving an anchor point position broadcast instruction, broadcasting an anchor point position according to the anchor point position broadcast instruction.

12. The indoor positioning method of claim 11, wherein the state data of the mobile terminal comprises one or more of a current time, a wireless communication device connection state, mobile terminal motion state, illumination data and magnetic field strength data.

13. The indoor positioning method of claim 11, wherein the sending the beacon positioning request comprises: sending the beacon positioning request regularly based on a preset time interval.

14. The indoor positioning method of claim 11, wherein the anchor point position broadcast instruction at least comprises identifier information of the anchor point position, such that anchor point position broadcast at least comprises the identifier information of the anchor point position.

15. An indoor positioning method, comprising:
    in response to receiving an anchor point position broadcast from a beacon terminal, obtaining identifier information of an anchor point position in the anchor point position broadcast;
    generating and sending an anchor point position obtaining request, wherein the anchor point position obtaining request carries the identifier information of the anchor point position;
    in response to receiving feedback information of the anchor point position obtaining request, obtaining an anchor point position of the beacon terminal and performing positioning based on the anchor point position.

16. The indoor positioning method of claim 15, wherein the performing positioning based on the anchor point position comprises:
    determining signal transmission direction and strength of the beacon terminal;
    determining a positional relationship with the beacon terminal according to the signal transmission direction and strength;
    determining a position of the mobile terminal according to the positional relationship with the beacon terminal and the anchor point position of the beacon terminal.

* * * * *